Figure 10:
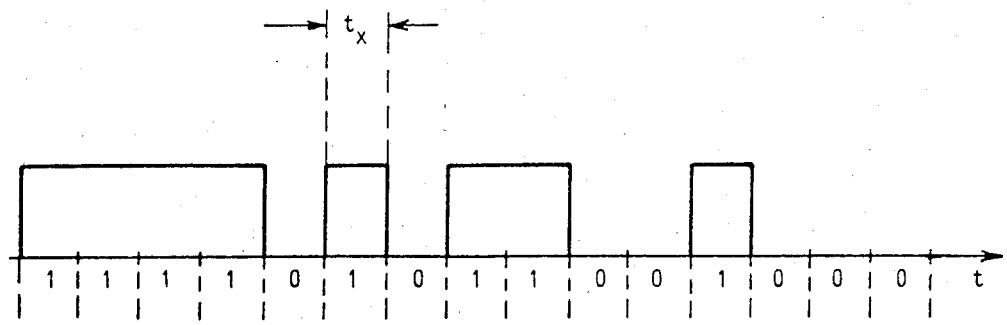

United States Patent [19]
Massen

[11] Patent Number: 4,604,904
[45] Date of Patent: Aug. 12, 1986

[54] SENSOR FOR THE DETECTION OF RANDOM SIGNALS WHICH ARE SUITABLE FOR CORRELATIVE SIGNAL PROCESSING

[75] Inventor: Robert Massen, Radolfzell, Fed. Rep. of Germany

[73] Assignee: Endress u. Hauser GmbH u. Co., Maulburg, Fed. Rep. of Germany

[21] Appl. No.: 533,989

[22] Filed: Sep. 20, 1983

[30] Foreign Application Priority Data

Sep. 27, 1982 [DE] Fed. Rep. of Germany ....... 3235750

[51] Int. Cl.$^4$ .......................... G01F 1/712; G01F 1/74
[52] U.S. Cl. .................................. 73/861.06; 73/861.04
[58] Field of Search ............ 73/861.04, 861.06, 861.08, 73/861.09; 324/160

[56] References Cited

U.S. PATENT DOCUMENTS

| | | | |
|---|---|---|---|
| 3,762,221 | 10/1973 | Coulthard | 73/861.06 |
| 4,248,085 | 2/1981 | Coulthard | 73/861.06 |
| 4,257,275 | 3/1981 | Kurita et al. | 73/861.06 |
| 4,363,244 | 12/1982 | Rabeh et al. | 73/861.08 |

FOREIGN PATENT DOCUMENTS 0074617 5/1982 Japan ................................ 73/861.06
0979858 12/1982 U.S.S.R. ........................... 73/861.06

Primary Examiner—Charles A. Ruehl
Attorney, Agent, or Firm—Gerald J. Ferguson, Jr.

[57] ABSTRACT

The sensor (20) is intended for the detection of random signals, suitable for correlative signal processing, originating from a process in motion relative to the sensor, for example a flow passing through a pipeline (1). Signals of this nature are used, in particular, for the measurement of velocity or running time. The sensor (20) is subdivided into several sensor segments (21, 22, 23, 24) in order to increase sensitivity for a given spatial frequency filter effect. In the case of a capacitive sensor, each sensor segment consists of two electrodes encompassing the pipeline (1). The sensor segments (21, 22, 23, 24) are arranged along the direction of motion according to a coding selected on the basis of the desired spatial frequency filter effect, with the introduction of gaps (25, 25, 27) which are insensitive to the characterizing parameter of the process in motion. The spatial frequency filter effect and, in particular, its limit frequency, will then correspond to that of an individual sensor segment, while the total aperture, which determines the sensitivity, is equal to the sum of the aperture segments of the sensor segments present.

6 Claims, 13 Drawing Figures

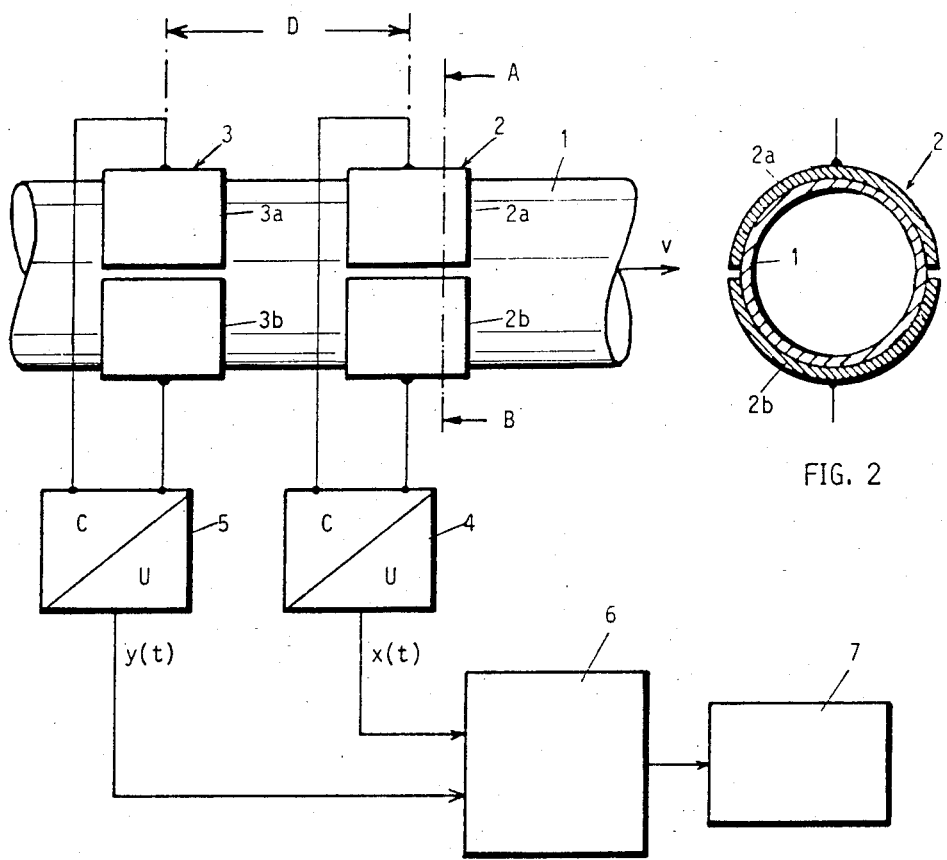
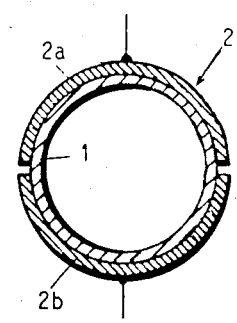
FIG. 2
FIG. 1
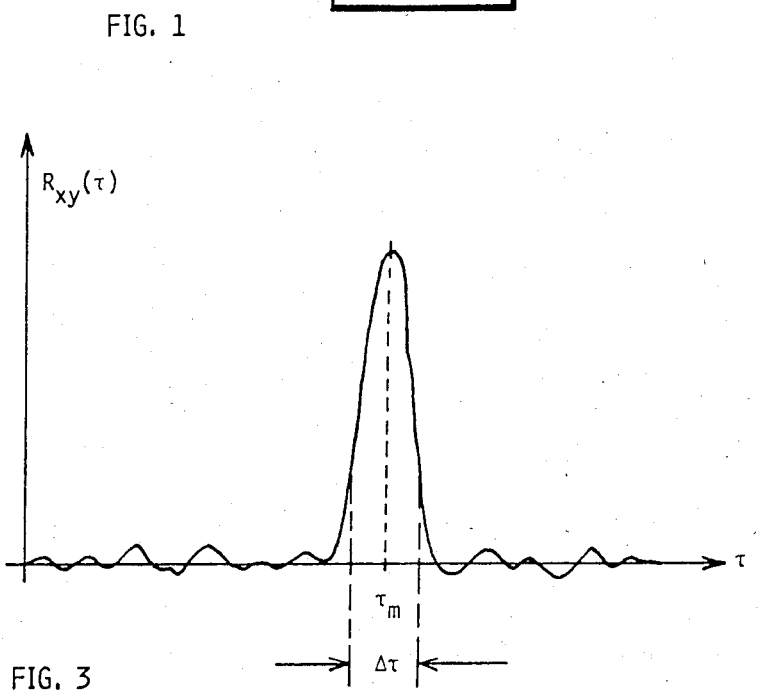
FIG. 3

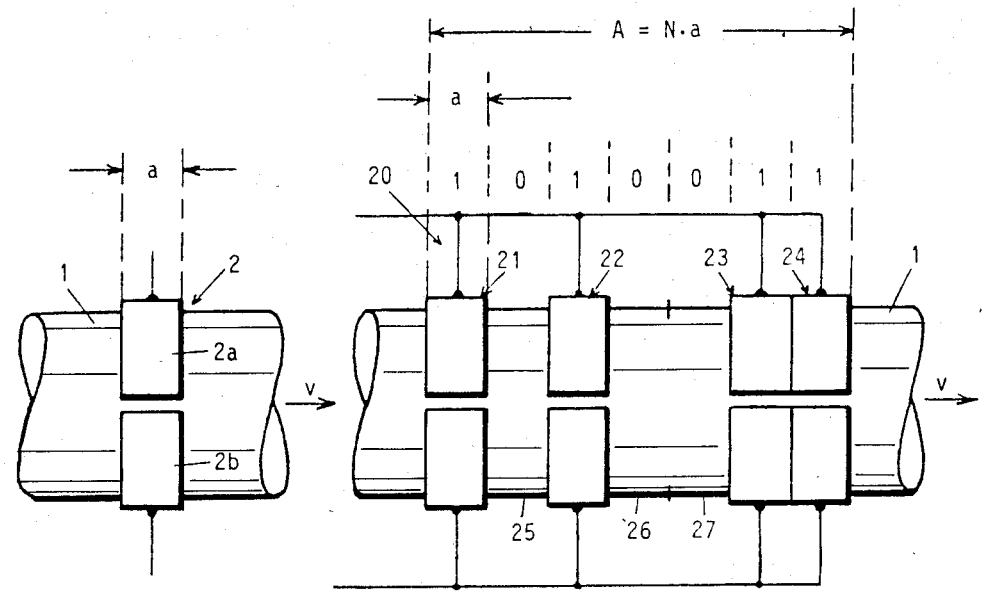
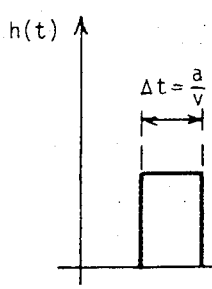
FIG. 4
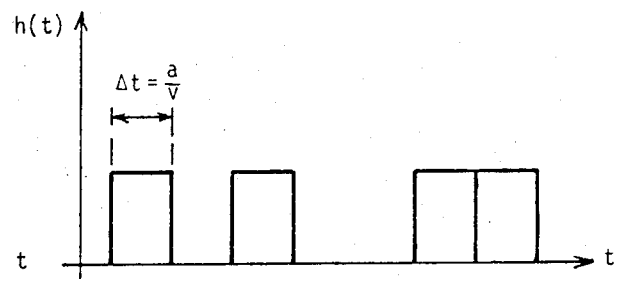
FIG. 7
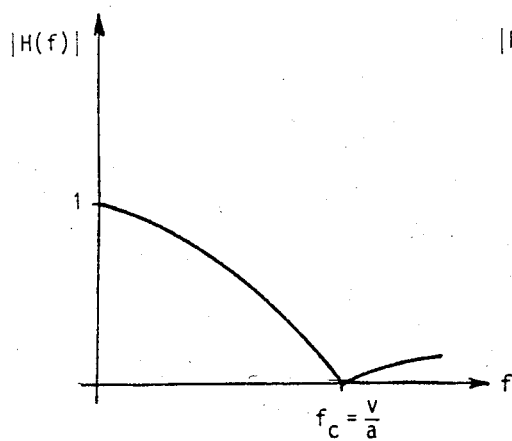
FIG. 5
FIG. 6
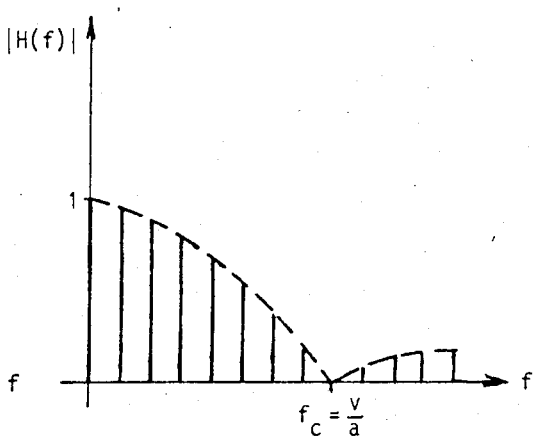
FIG. 8
FIG. 9

SENSOR FOR THE DETECTION OF RANDOM SIGNALS WHICH ARE SUITABLE FOR CORRELATIVE SIGNAL PROCESSING

The invention concerns a sensor for the detection of random signals, being suitable for correlative signal processing and originating in a process which is in motion relative to the sensor; it is particularly intended for the correlative measurement of velocity or running time, with an overall aperture sensitive to a parameter of the process in motion.

As is known, the principle of correlative measurement of velocity or running time is that random signals are captured using sensors which are normally contactless located at two points of the process in motion, separated one from the other along the direction of motion, forming the cross-correlation function of the two signals and deducing information regarding the running time and velocity of the process in motion from the location of the maximum. The sensors are selected such that they respond to a parameter of the process in motion which is as significant as possible or which is easy to determine. Capacitive sensors, ultrasonic sensors, optical sensors, thermal sensors, charge-sensitive sensors or conductivity sensors can, for example, be employed. All these sensors register a specific spatial section, which is of finite extent in the direction of motion of the moving process; by analogy with optical systems, this section is known as the "stop" or "aperture". As is well-known, every aperture represents a spatial filter ("spatial frequency filter"), having an upper frequency limit which is dependent on the geometry and velocity of the process in motion. The band width of the signal registered is limited by this factor. Now, the width of the correlation maximum, which in its turn determines the statistical uncertainty of the correlation evaluation, however, is inversely proportional to the band width. Thus, for a precise correlation evaluation, it is necessary that the two signals to be correlated both possess as wide a band width as is possible. This means that the aperture of the sensors, i.e. the extension along the direction of movement, should be as small as possible.

On the other hand, a precondition for a good correlation is that the sensors are of sufficient sensitivity. The sensitivity of a sensor can, in particular, be increased by increasing the size of the section of space observed, that is by means of a larger aperture. For example a capacitive sensor is made more sensitive if larger electrodes are used. At the present time it is particularly necessary that relatively large electrode areas are used when the velocity of flow in pipelines having a large cross-section is being measured, in order that the capacity and sensitivity of the sensors are adequate. An example of this is the correlative determination of the velocity of pneumatically transported solids, such as wheat, granulates, coal dust etc., where large section pipes are often used. Increasing the size of the aperture, however, also increases the sensors' low-pass filter effect, so that the band width of the captured signal is reduced. The statistical uncertainty of the measurement is consequently increased. The measurement period needs to be set very high in order to reduce the statistical uncertainty.

The aim of the invention is to produce a sensor having a large total aperture and consequently high sensitivity, where the limit frequency of the spatial frequency filter effect, however, is high in relation to the aperture.

In this invention this is achieved by subdividing the total aperture into aperture segments which are arranged in the direction of motion according to a coding, selected on the basis of the desired spatial frequency filter effect, by means of the inclusion of gaps which are not sensitive to the parameter of the process in motion.

The invention is founded on the property of binary codes for data transmission, known from the field of statistical information technology, which results in a time-compressed signal despite a long total duration of correlative reception (correlation code, Barker codes, binary pseudo-random codes, m-sequences etc.). Binary codes are also known which have spectral properties obeying specific regularities whereby, for instance, their spectrum shows a great similarity to that of a single impulse. The class of PN sequences (pseudo-random codes) may be cited as a typical example of this. The spectrum envelope of a PN sequence is identical to the spectral density curve of a single impulse, i.e. the well-known sin x/x function, also called the gap function. The essential difference is that the spectrum of the PN sequence consists of N discrete spectral lines, where N represents the period of the PN sequence. The differences between the two spectra are very slight, particularly in the case of more lengthy periods.

The division of the total aperture of a sensor according to the regularity of such a code means that the impact response of the spatial frequency filter formed in this way is equal to the time pattern of the code sequence, and the frequency response of the spatial frequency filter formed by the sensor apparatus is equal to the spectrum of this code sequence. In particular, the limit frequency of this spatial frequency filter is independent of the spatial extension, seen in the direction of motion, and is only dependent on the length of the narrowest code segment occurring. Thus, although the sensitivity of the sensor is increased in accordance with the number of aperture segments, the sensor has a limit frequency which corresponds to that of a single aperture segment. The sensitivity of the sensor is thus considerably increased for the same limit frequency.

A further advantage of the sensor arrangement being extended as a result of coding is that a large number of elemental events are recorded at any point in time and thus more information is fed into the correlative evaluation per unit of time. This leads to greater values for the correlation coefficient.

The subdivision of the total aperture into individual aperture segments, and the spatial distribution of these aperture segments along the direction of motion permits an advantageous sensor design in that the aperture segments can be arranged at an angle to each other around the process which is to be assessed. In this way, it is possible to observe the process from various directions, in order to pick up random signals from all directions.

The extension of the sensor along the direction of motion as a result of subdivision and coding is not generally perturbing. If the smallest possible distance between centres is undesirably large in the case of a correlative measuring arrangement with two sensors arranged along the direction of motion of the process with a reciprocal distance between centres, this distance can be reduced. This is achieved by means of a particularly useful extension of the invention in that the end sections of the sensors opposing each other are interlaced in such a way that the effective aperture segments of each sensor are located within the code gaps of the other sensor. Obviously it is necessary to select the coding of the sensor apertures accordingly, but this is generally possible.

Figure 11:
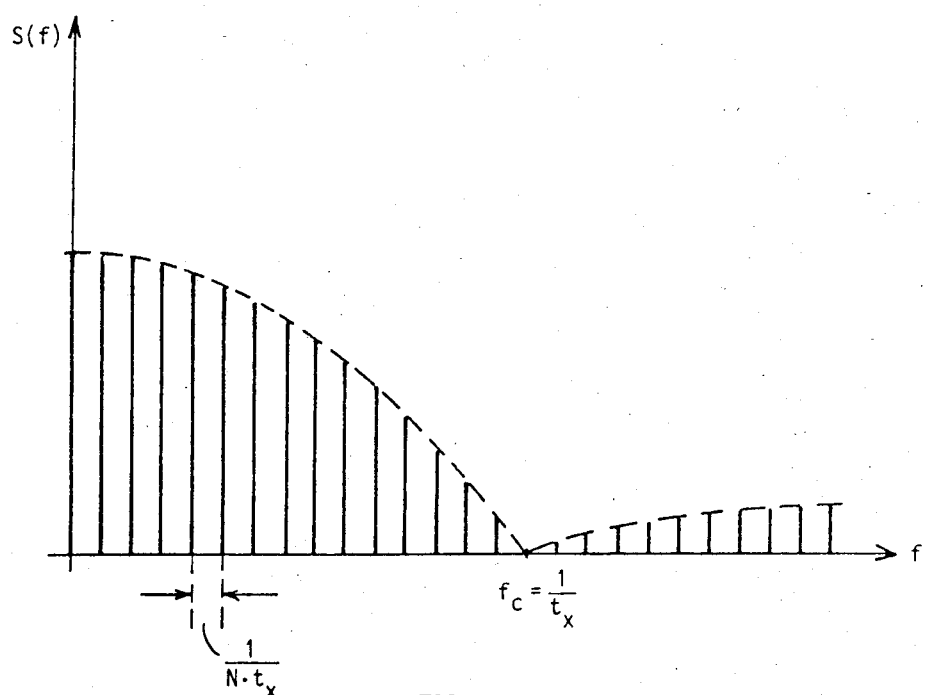
Figure 12:
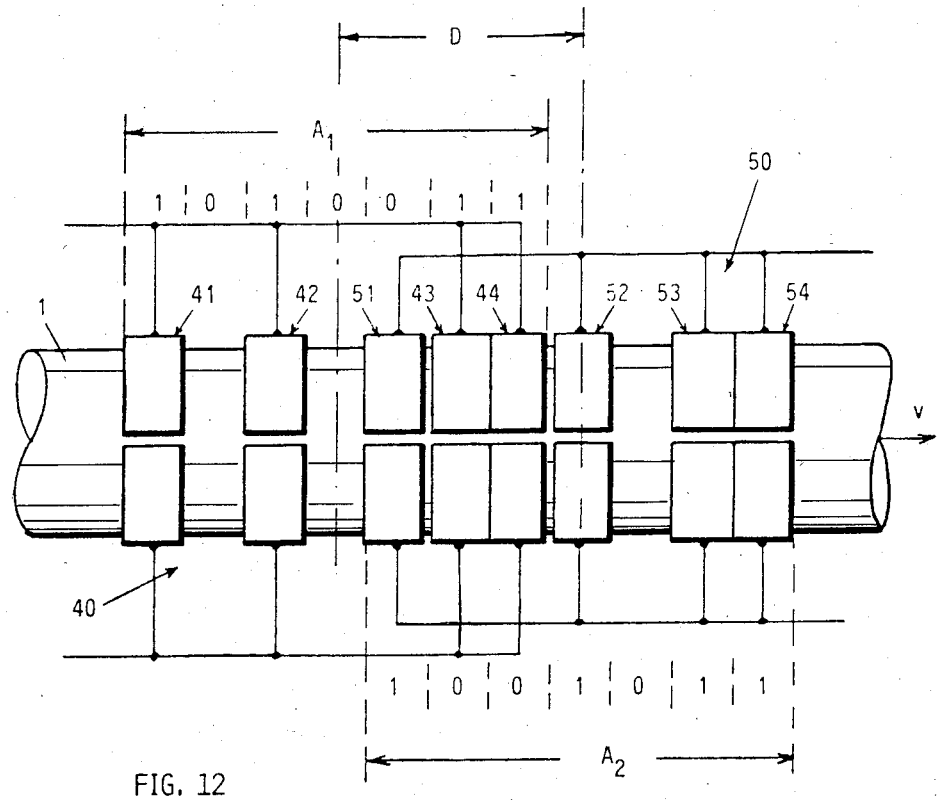
Figure 13:
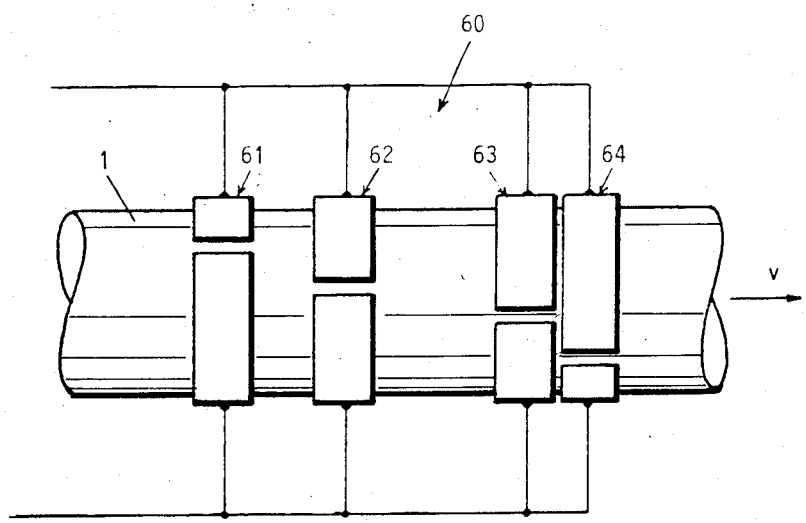

Further advantages and characteristics of the invention may be seen from the following description of design examples, illustrated in the figures. The figures show:

FIG. 1 An arrangement for the contactless measurement of the flow rate of a medium in a pipeline, FIG. 2 a cross-section through the pipeline illustrated in FIG. 1, taken across the section A–B, FIG. 3 the correlation function determined by means of the correlation system illustrated in FIG. 1, FIG. 4 a capacitive sensor fitted to a pipeline in order to determine the spatial frequency filter effect, FIG. 5 the impact response of the sensor in FIG. 4, FIG. 6 the frequency spectrum of the impact response illustrated in FIG. 5, FIG. 7 a sensor constructed in accordance with the invention with several sensor segments arranged according to a coding, FIG. 8 the impact response of a sensor as illustrated in FIG. 7, FIG. 9 the frequency spectrum of the impact response illustrated in FIG. 8, FIG. 10 an example of a binary PN sequence with the period N=15, FIG. 11 the frequency spectrum of the PN sequence illustrated in FIG. 10, FIG. 12 two partially interlaced coded sensor arrangements in accordance with this invention, and FIG. 13 a sensor constructed in accordance with this invention, the sensor segments of which are arranged so as to have a mutual angular displacement.

By way of an example of an application, FIG. 1 shows an arrangement for the contactless measurement of the flow rate v of a pneumatically transported solid, e.g. coal dust, in a pipeline 1. Two capacitive sensors 2 and 3 are located on pipeline 1 at a known distance between centres D, the two sensors detecting random signals which correspond to the random dielectric fluctuations in the flow. Capacitive sensor 2 consists of two electrodes 2a and 2b, which each extend over a part of the circumference of the pipeline 1 (FIG. 2) and which are connected to the input terminals of a capacitance/voltage transducer 4, which gives an output signal x(t) reproducing the dielectric fluctuations detected by capacitive sensor 2. Capacitive sensor 3 consists of two similarly located electrodes 3a and 3b which are connected to the input terminals of a capacitance/voltage transducer 5, the output signal y(t) of which reproduces the dielectric fluctuations detected by capacitive sensor 3. The outputs of the two capacitance/voltage transducers 4 and 5 are connected to the two inputs of a correlator 6, which computes the cross-correlation function between signals x(t) and y(t).

It is know that the flow rate v in pipeline 1 can be determined by calculation of the cross-correlation function $R_{xy}(\tau)$ between the two signals x(t) and y(t). This determination is founded on the fact that the signals generated at the two sensors 2 and 3 on the passage of the same flow components (eddies) show certain similarities, which will result in a maximum cross-correlation function. The cross-correlation function has the mathematical form $$R_{xy}(\tau) = \lim_{T \to \infty} \frac{1}{T} \int_o^T x(t) y(t + \tau) dt. \quad (1)$$

This means that the instantaneous values for signal x(t) are multiplied by the instantaneous values for signals y(t) transposed by a displacement time $\tau$ and the average value is determined across the duration of the observation time T. A discrete value of the cross-correlation function is received for each value of the displacement time $\tau$.

FIG. 3 shows the output signal of correlator 6 as a function of the displacement time $\tau$, that is to say the cross-correlation function. In the example application given here the cross-correlation function has its maximum at a specific displacement time $\tau_m$, which is identical to the running time occupied by the medium between sensor 3 and sensor 2, so that the following applies:

$$v = \frac{D}{\tau_m}.$$

An interpreter 7 connected to the correlator 6 analyses the cross-correlation function for its maximum and states the displacement time $\tau_m$ concerned or the flow velocity v calculated from this.

The cross-correlation function measured can be evaluated the more accurately the greater the value for the correlation maximum $P_{xy}(\tau_m)$ and the narrower the width $\Delta\tau$ of the correlation maximum. The width of the correlation maximum is inversely proportional to the band width of the signals detected, and an approximate value for the statistical uncertainty of the correlation maximum detected is given by $$\sigma(\tau_m) = k \cdot \frac{1}{B^{1,5} T^{0,5}} \sqrt{\left(1 + \frac{1}{P_{xy}^2(\tau_m)}\right)} \quad (2)$$

Where:
B = band width in c/s
T = duration of measurement in s
$P_{xy}$ = standardized correlation coefficient
$\sigma(\tau_m)$ = standard deviation for the running time.

Thus, for a precise correlation evaluation it is important that the two signals to be correlated are as well correlated as is possible (i.e. they are as similar as possible) and that their band width B is as wide as possible. A good correlation further requires that the sensors detect the inhomogeneities present as well as possible and suffer as little as possible from external noise, e.g. electronic noise. There must be good sensitivity towards the inhomogeneities to be detected.

These requirements are, to some extent, mutually contradictory. This is, in particular, a consequence of the fact that each sensor covers a specific section in space. In order to demonstrate this, FIG. 4 shows pipeline 1 once again with sensor 2. If the problem is viewed in a simplified manner, only for the relevant direction of motion which in FIG. 4 is along the axis of the pipe, the section covered by electrodes 2a and 2b of the capacitive sensor 2 is a path a which is equal to the dimension of the electrodes along the direction of motion. By analogy with optical sensors this section is known as "aperture a". It is already known that each aperture represents a spatial filter, known as a spatial frequency filter. Even if the process itself has infinite band width (i.e. shows infinitely small inhomogeneities), a sensor with a finite aperture a only captures frequencies up to an upper limit frequency, which is defined by the following equation $$f_c = \frac{v/m \cdot s^{-1}}{a/m} \quad (3)$$

FIG. 5 illustrates the impact response h(t) for the rectangular aperture a of sensor 2, i.e. the response of the sensor to an infinitely narrow excitation, as a function of time τ. The graph in FIG. 6 represents the frequency response H(f) of the spatial frequency filter formed by aperture a, which can be calculated by Fourier transformation from the impact response h(t) of FIG. 5. The filter curve as shown in FIG. 6 has the known shape of the function sin x/x, also known as the gap function.

It may be stated by way of summary, that each finite aperture represents a filter for the frequencies to be determined, where the limit frequency of this spatial frequency filter is dependent on geometry and velocity.

It is is generally necessary, in order to raise the sensitivity of a sensor, to increase the size of the spatial section covered by the sensor. For exmaple, the capacitive sensors illustrated in FIG. 1 can be made more sensitive by the use of larger electrodes. However, according to the above equation (3), the low-pass filter effect is also increased by an extension of the size of the electrodes in the direction of motion, so that the band width of the signals detected is reduced. However, a reduction in the band width is not desired, according to formula (2), because this would mean increasing the statistical uncertainty of the measured result.

The phenomena illustrated above on the basis of capacitive sensors also apply similarly to other types of sensors used for the detection of random signals, such as ultrasonic sensors, optical sensors, charge or conductivity sensors etc. The choice of which sensor is to be used in any particular case depends on which physical inhomogeneity is particularly distinctive, or can be particularly easily detected.

FIGS. 7 to 9 illustrate, once again for the case of capacitive sensors, how the sensitivity of a sensor can be substantially increased whilst maintaining a high limit frequency for the spatial frequency filter effect. The capacitive sensor 20 in FIG. 7 is made up of several segments 21, 22, 23, 24 each of which has an aperture a. The sensor segments 21, 22, 23, 24 are arranged in the manner of a binary code by the introduction of the gaps 25, 26, 27; in the case illustrated in FIG. 7, this code has seven digits and reads 1010011. The signals originating from the individual sensor segments are totalled, in the simplest case merely by connecting the sensor segments together as is indicated in FIG. 7. It is, however, also possible to connect the electrodes to separate selector circuits, the output signals of which are then totalled. The coding according to which the sensor segments in FIG. 7 are arranged is selected so that a specific spatial frequency filter effect is achieved. Binary codes for data transmission are known from the field of statistical information technology, which result in a time-compressed signal despite a long total duration of correlative reception (correlation codes, Barker codes, binary pseudo-random codes, m-sequences etc.).

Binary codes are also known which have spectral properties obeying specific regularities, for instance, such that the spectrum of the whole code word shows a great similarity to that of a single impulse. FIG. 10 shows, as a typical example of one such code, a code word from the class of PN sequences (pseudo-random codes) with a period N=15, and FIG. 11 represents the frequency spectrum of this code word. The spectrum envelope of a PN sequence is identical to the spectral density curve of a single impulse, i.e. the familiar sin x/x function, also called the gap function. The essential difference is that the spectrum of the PN sequence consists of N discrete spectral lines, where N represents the period of the PN sequence. The differences between this spectrum and the spectrum of a single impulse are very small, particularly in the case of more lengthy periods.

The spatial code of the sensor segments illustrated in FIG. 7 corresponds to one such PN sequence which, for the purpose of clarification has been chosen to be very short with its length N=7. Consequently the impact response of the spatial frequency filter constituted by sensor 20 is also one such PN sequence as a function of time (FIG. 8). FIG. 9 illustrates the frequency spectrum of the impact response in FIG. 8, that is to say the frequency response of the spatial frequency filter constituted by the arrangement of sensors shown in FIG. 7. The spectrum consists of seven discrete spectral lines, the envelope of which is equivalent to the graph of the filter curve of an individual sensor segment, which means that it coincides with the spatial frequency filter curve in FIG. 6. In particular, the limit frequency for this spatial frequency filter is independent of the spatial extent, measured in the direction of motion, and is only dependent on the length of the aperture segment of a single sensor segment.

A comparison of FIGS. 4 and 7 shows that the sensor layout in FIG. 7 has an overall length A=N.a, i.e. it is longer than the length a of the sensor in FIG. 4 by a factor N. The total aperture of the sensor layout in FIG. 7 consists of the sum of the aperture segments of the sensor segments shown there. (N+1)/2 sensor segments make up the PN sequence selected for the code. Consequently the total aperture, and thus the sensitivity of the sensor layout in FIG. 7, is increased by the factor (N+1)/2 in comparison with that shown in FIG. 4, whilst the limit frequency remains unchanged. The total capacity of the sensor layout in FIG. 7, assuming ideal paths for the field lines, has also increased by the factor (N+1)/2. This is a great advantage, in particular in the case of large pipe cross-sections, since in this case for capacity of a single annular sensor segment would be very small, and thus difficult to evaluate.

A further advantage of a sensor layout extended and coded in the manner illustrated in FIG. 7 is that a large number of elemental events are being recorded at any one time and thus more information is being introduced into the correlative evaluation per unit of time. This leads to greater values for the correlation coefficient $P_{xy}(\tau m)$.

As is clear from the above description, the greater the period N of the PN sequence, the better is the approximation of the spatial frequency filter curve (FIG. 9) for the coded sensor layout to the spatial frequency filter curve (FIG. 6) of a single sensor (FIG. 7). The envelope of a spectrum and thus also the limit frequency remains unchanged, where the dimensions of the individual sensor segments remain unchanged, whereas the number of spectral lines is increased. Furthermore, the total aperture, and thus the sensitivity and, in the case of capacitive sensors the total capacity, increases. However, the length A of the sensor arrangement in the direction of movement being measured becomes correspondingly larger. This can give rise to problems of space where two coded sensor arrangements have to be located at an interval D in a correlative measurement layout as illustrated in FIG. 1. The interval D between sensors is determined by the centre-to-centre distance of each sensor layout, such that the minimum interval approximately corresponds to the overall length A of a sensor layout.

FIG. 12 illustrates, again for the case of capacitive sensors, two coded sensor layouts 40 and 50, which are arranged along pipeline 1 for the purpose of velocity measurement; however, the centre-to-centre interval D here for the two sensor layouts is substantially smaller than the overall length of each of the two sensor layouts A1 and A2 respectively. This is achieved by "interlacing" the two coded sensor layouts. In order for this to be possible, code words must be selected which permit such a partial interlacing; i.e. code words where a certain number of code gaps at the end of the first sensor layout coincides with a certain number of code bridges at the beginning of the second sensor layout (read in the direction of motion). The concept "code gap" stands here for the binary zero, the concept "code bridge" for the binary one.

Sensor layout 40 illustrated in FIG. 12 contains sensor segments 41, 42, 43, 44 which are arranged according to the code word 1010011. Sensor layout 50 contains sensor elements 51, 52, 53, 54, arranged according to the code word 1001011. Thus in both cases these are Pn sequences with a period N=7. The two last sensor segments in sensor layout 40 are located in the two code gaps between the first sensor segments 51, 52 in the sensor layout 50.

It can be particularly desirable in the case of flow profiles which are not rotationally symmetrical to observe the processes from more than one direction, in order to be able to pick up random signals from all directions. This is possible in a particularly simple manner as a result of the subdivision into sensor segments and the spatial extension of the coded sensor layouts described above by locating the sequential sensor segments displaced at angles one to another, i.e. so that they are, to a certain degree, "wrapped around" the process in motion. FIG. 13 illustrates this measure for the case of a capacitive sensor layout 60 with four sensor segments 61, 62, 63, 64 located along the pipeline 1. The two electrodes of each sensor segment have an identical, practically hemicylindrical form but the diametrical separating planes between the two electrodes are set at an angle to each other. In this way random signals may be picked up from the process in motion from many sides. In this manner it is possible to reduce, or even completely to exclude, profile influences resulting from the arrangement of the electrodes, particularly in the region of an inflow into a pipeline flow.

The application of the measures described above for the case of capacitive sensors to other sensors such as ultrasonic sensors, optical sensors, thermal sensors, charge-sensitive sensors, conductivity sensors etc., is clear to the engineer from the above description without further comment. The sensor aperture in each case is to be understood to refer to the area of sensitivity directed towards the process in motion. In the case of optical sensors this is the path of the rays, in the case of ultrasonic sensors, the sound beam to be scanned etc. An aperture segment corresponds to each sensor segment, and the total aperture of a sensor layout is constituted by the sum of the aperture segments.

I claim:

1. Sensor for the detection of random signals from a process in motion relative to the sensor, said signals being suitable for correlative signal processing, in particular for the purposes of correlative measurement of velocity or running time, said sensor having a total aperture sensitive to a parameter characteristic for the process in motion, said total aperture being subdivided into aperture segments separated by gaps which are not sensitive to said parameter of the process in motion, said aperture segments and gaps being arranged along the direction of motion according to a binary coding which results in a time-compressed signal upon correlative reception.

2. Sensor as claimed in claim 1, wherein said binary coding corresponds to a pseudo-random code.

3. Sensor as claimed in claim 1, wherein said binary coding corresponds to a binary PN sequence.

4. Sensor as claimed in claim 1, wherein said aperture segments are oriented at different angles around the process to be measured.

5. Sensor as claimed in claim 1, wherein said aperture segments are constituted by the appropriately subdivided electrodes of a capacitive sensor.

6. Correlative measuring arrangement comprising two sensors as claimed in claim 1, arranged along the direction of motion of the process at a predetermined center-to-center interval, wherein the effective aperture segments of the end portion of each sensor are located in gaps of the end portion of the other sensor so that said end portions of the two sensors are interlaced.

* * * * *